Oct. 23, 1945.  G. RAYMOND  2,387,353
SAFETY DEVICE FOR PRESSURE VESSELS
Filed May 17, 1943

INVENTOR
Gwynne Raymond.
BY
Arthur C. Brown
ATTORNEY

Patented Oct. 23, 1945

2,387,353

UNITED STATES PATENT OFFICE 2,387,353

SAFETY DEVICE FOR PRESSURE VESSELS

Gwynne Raymond, Oklahoma City, Okla.

Application May 17, 1943, Serial No. 487,253

3 Claims. (Cl. 220—89)

This invention relates to safety devices for the protection of pressure vessels, systems of piping and the like apparatus wherein hazardous pressure differentials are apt to occur between the high and low pressure sides thereof.

Previous safety devices consist of concavo-convex diaphragms of the type illustrated in my Patent No. 1,930,960 granted October 17, 1933. Diaphragms of this character are usually positioned between the high and low pressure sides with the high pressure acting upon the concave face of the diaphragm so that should the pressure rise toward the danger point, the diaphragm ruptures at the predetermined pressure for which it was designed, thereby relieving the excessive pressure. In many installations such diaphragms are completely satisfactory but when the operating conditions are such that the pressure on the concave side of the diaphragm drops below the pressure on the convex side, the diaphragm may reverse its form and be distorted so that it is weakened to such an extent that when the pressure again appears, the diaphragm will burst far below its rated rupture pressure.

It is the principal object of the present invention to provide a safety device of this character wherein the diaphragm is not directly subjected to pressure normally causing such distortion when the internal pressure or that acting upon the concave side drops below the external pressure or that acting upon the convex side.

In accomplishing this and other objects of the invention as hereinafter pointed out, I have provided improved structure, the preferred form of which is illustrated in the accompanying drawing wherein.

Figure 1:
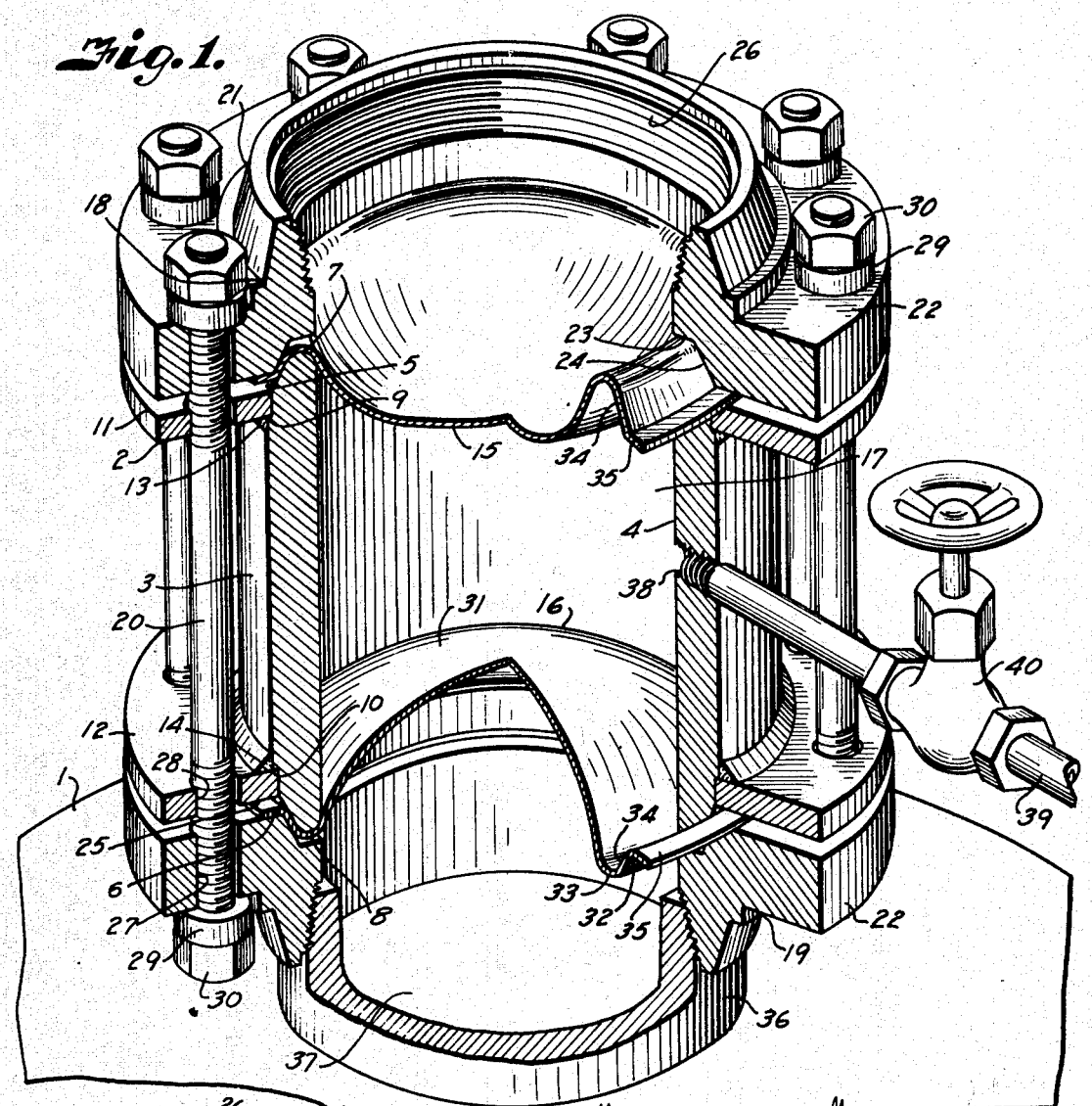
Fig. 1 is a perspective view, partly in section, of a safety device embodying the features of the present invention.

Referring more in detail to the drawing:

1 designates a tank or vessel normally subject to internal pressures in excess of the external pressure which may be atmospheric pressure so that a safety device is needed to protect the tank in case the internal pressure should rise above the safe working pressure for which the tank was designed. While such tanks usually contain a higher internal pressure than atmosphere, there are times in which the internal pressure may drop below the external pressure; for example, when the tank is rapidly emptied of its contents or a rapid change in temperature occurs or from any other reason brought about incidental to operation of the tank. As above pointed out, this reversal of pressure effects weakening of a safety device of the diaphragm type so that when the internal pressures are again established, the safety device is apt to function below its rated pressure.

In carrying out the present invention, I have provided a safety device 2 of the diaphragm type which is not affected by the reversal of pressure, as now to be described.

The safety device 2 includes a ring-like body member 3 having an annular wall 4 provided with beveled ends 5 and 6 terminating in rounded faces 7 and 8 to form diaphragm clamping and seating portions which extend circumferentially of the respective ends of the body member. The ends of the body member below the bevels are shouldered as at 9 and 10 to seat annular rings 11 and 12 which are secured in position as by welding 13 and 14 to enhance rigidity of the body member and retain the cylindrical shape thereof. Seated on the ends of the body member are diaphragms 15 and 16 which normally close the ends of the body member and provide a closed chamber 17 therebetween when the diaphragms are clamped in position.

The diaphragms are clamped to the seats by clamping rings 18 and 19 and draw bolts 20. The clamping rings include collar portions 21 which in effect form continuations of the wall of the body member and have laterally extending annular flanges 22 substantially conforming to the rings 11 and 12 previously described. The inner faces of the flanges are provided with annular shoulder-like recesses 23 having inclined faces 24 conforming to the beveled faces 5 and 6 of the body member and horizontal faces 25 spaced from and underlying the rounded faces 7 and 8 of the body member. The inner circumference of the clamping members thus substantially conform to the inner circumference of the body member so as to provide a substantially smooth passageway for relieving of pressure when the diaphragms rupture as later described.

The collar portions 21 are preferably counterbored and internally threaded as at 26. The draw bolts 20 extend through openings 27 in the flanges 22 of the clamping rings and through registering openings 28 in the reinforcing rings 11 and 12. The ends of the draw bolts project from the flanges and are provided with washers 29 and nuts 30.

The diaphragms 15 and 16 are of the type illustrated and described in the above mentioned patent and are preformed of a relatively lightweight non-corrosive, nonsparkable conductive metal that may be readily drawn to shape for providing dome shaped central portions 31 without placing the material under internal tension that might cause thinning and weak spots which would be subject to fractures at pressures below a predetermined pressure.

Figure 2:
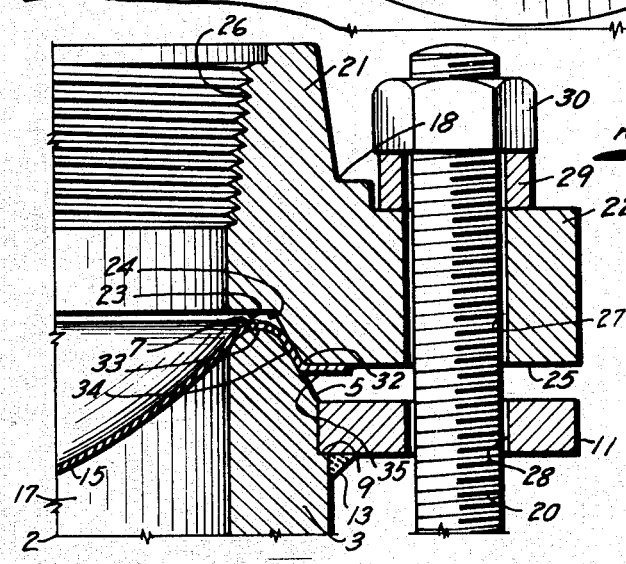
Fig. 2 is an enlarged fragmentary section through a portion of the safety device particularly illustrating the mounting of one of the diaphragms thereof.

The dome portions of the diaphragms are provided with integral annular anchorage flanges 32 which extend therefrom in rounding curves 33 terminating in reversely and outwardly flaring portions 34 having laterally directed rims 35. The curved portions 33 thus form annular groove-like seats closely engaging the rounded ends of the body member and the flaring portions 34 engage the bevels 5 and 6 of the body member, to be firmly anchored thereagainst upon engagement of the clamping faces 24 of the clamping rings. The flaring portions are of suitable depth so that the rims 35 overlie the faces of the clamping rings as shown in Fig. 2. When the diaphragms are in position, the convex sides thereof face inwardly of the chamber 17 and the concave sides face outwardly to be acted upon by pressure of the tank and external pressure respectively.

In the illustrated instance, the safety device is mounted upon a collar 36 which includes a relief opening 37 in the tank 1 by screwing the collar portion of the clamping ring 19 thereon.

A diaphragm 16 is selected, having a predetermined rupture pressure above the normal working pressure of the vessel but below the safe working pressure for which the tank was designed. The diaphragm 15, however, is selected to withstand the external pressure acting on the concave side thereof since it is freed of the pressure internally of the tank by reason of the diaphragm 16. In order that the diaphragm 16 will not be influenced by any action of the pressure acting upon the concave side of the diaphragm 15, means is provided for establishing a pressure in the chamber 17 lower than any pressure which may act on the concave side of the diaphragm 15.

The vacuum may be established in the chamber 17 through an opening 38 in the side wall of the body member through a pipe 39 threaded into the opening and having a shut-off valve 40 therein. The other end of the pipe may be connected with any suitable vacuum pump whereby a desired vacuum may be drawn within the chamber 17 after which the valve is closed to maintain the vacuum.

When the internal pressure in the tank drops below the external pressure or that acting upon the concave side of the diaphragm 15, the external pressure will be completely blocked from the convex side of the diaphragm 16 and any movement that may be effected in the diaphragm 15 cannot be transmitted to the critical diaphragm 16. Therefore, the diaphragm 16 is not subjected to distortion but retains its normal shape and calculated rupture pressure. When pressures build up within the tank and rise above the pressure for which the diaphragm 16 is rated, the diaphragm ruptures and allows release of pressure before dangerous pressure is reached. Release of pressure into the chamber 17 is with such velocity that diaphragm 15 is reversed and ruptured to complete the flow passageway for relief of internal pressure in the vessel.

If it is desired, the clamping ring 18 may be provided with a pipe having the end thereof threaded into the collar portion of the ring for conducting and carrying away pressure released from the tank when the diaphragms are ruptured.

From the foregoing it is obvious that I have provided a safety device wherein the diaphragm which is dependent upon maintaining safety of the tank is protected from the effects of external pressure in case the internal pressure should drop below the external pressure. Thus, the critical diaphragm 16 maintains its normally rated rupture pressure and will function at that pressure even though the working pressure of the tank has dropped numerous times below the external pressure.

What I claim and desire to secure by Letters Patent is:

1. A safety pressure device including a tubular body providing a relief passageway therethrough, concavo-convex frangible diaphragms closing ends of the tubular body with the convex sides of said diaphragms in facing relation and with the concave sides adapted to be subjected to differential pressures, said diaphragms being adapted to fracture when the pressure acting on the concave side of one diaphragm exceeds a predetermined maximum pressure for relieving said pressure through the relief passageway, and said relief passageway being normally evacuated to prevent pressures less than the bursting pressure acting on the concave side of one diaphragm from distorting the convex side of the other diaphragm.

2. A safety pressure device including a ring-like support adapted to encircle the safety port in a pressure vessel and having an annular seat, a concavo-convex diaphragm having an annular flange engaged with said seat and arranged with the concave side subject to pressure in said vessel and adapted to fracture when the pressure exceeds a predetermined maximum, a tubular body encircling the convex side of the diaphragm and engaging said flange, a frangible concavo-convex diaphragm having a flange seated on the other end of said body with the convex side of the diaphragm facing the convex side of the first named diaphragm and subject to pressure externally of the vessel, said passageway between the diaphragms being evacuated so as to prevent fluctuation of one diaphragm from being transmitted to the convex side of the other diaphragm, a ring-like support engaging the flange of the last named diaphragm, and means clamping the body between the supporting rings to anchor said diaphragms.

3. A safety pressure device including a support adapted to encircle the safety port in a pressure vessel, a concavo-convex diaphragm seated on said support with the concave side subject to pressure in said vessel and adapted to fracture when the pressure exceeds a predetermined maximum in said vessel, a tubular body encircling the convex side of the diaphragm, a diaphragm support carried at the opposite end of the tubular body, a similar concavo-convex frangible diaphragm on the support at said opposite end with the convex side of the diaphragm facing the convex side of the first named diaphragm and with the concave side subject to pressure externally of the vessel to protect the convex side of the first named diaphragm from said external pressure, said passageway between the diaphragms being evacuated so as to prevent fluctuations that occur under nominal pressures on one diaphragm from being transmitted to the convex side of the other diaphragm, and means for retaining the diaphragms on said supporting members.

GWYNNE RAYMOND.